(12) United States Patent
Oh et al.

(10) Patent No.: US 7,335,241 B2
(45) Date of Patent: Feb. 26, 2008

(54) CYCLONE VESSEL DUST COLLECTOR AND VACUUM CLEANER HAVING THE SAME

(75) Inventors: Jang-keun Oh, Gwangju (KR); Yun-sup Hwang, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 435 days.

(21) Appl. No.: 11/017,454

(22) Filed: Dec. 20, 2004

(65) Prior Publication Data

US 2005/0252180 A1 Nov. 17, 2005

(30) Foreign Application Priority Data

May 14, 2004 (KR) ............... 10-2004-0034266

(51) Int. Cl.
*B01D 45/12* (2006.01)
(52) U.S. Cl. ............... 55/343; 55/349; 55/429; 55/459.1; 55/459.5; 55/DIG. 3; 15/353
(58) Field of Classification Search ............ 55/343, 55/349, 429, 459.1, 459.5, DIG. 3, 345; 15/350, 15/353
See application file for complete search history.

(56) References Cited

U.S. PATENT DOCUMENTS

| | | | |
|---|---|---|---|
| 1,416,995 A | | 5/1922 | Stroud |
| 2,385,745 A | * | 9/1945 | Vogt ............... 55/392 |
| 3,425,192 A | | 2/1969 | Davis |
| 3,672,502 A | | 6/1972 | Janich |
| 3,953,184 A | * | 4/1976 | Stockford et al. ......... 55/458 |
| 4,585,466 A | * | 4/1986 | Syred et al. .............. 55/349 |
| 7,128,770 B2 | * | 10/2006 | Oh et al. ................ 55/343 |
| 7,169,201 B2 | * | 1/2007 | Oh et al. ................ 55/343 |
| 2005/0251951 A1 | * | 11/2005 | Oh et al. ................ 15/353 |

FOREIGN PATENT DOCUMENTS

| | | |
|---|---|---|
| CN | 1334061 | 2/2002 |
| DE | 102004055192 | 12/2005 |
| GB | 835884 | 5/1960 |
| GB | 1207034 | 9/1970 |

(Continued)

OTHER PUBLICATIONS

Australian Office Action , Dec. 2006.

(Continued)

*Primary Examiner*—Robert A. Hopkins
(74) *Attorney, Agent, or Firm*—Ladas & Parry LLP

(57) ABSTRACT

Disclosed are a cyclone vessel dust collection and a vacuum cleaner including the same. The cyclone vessel dust collector comprises a cyclone vessel main-body including a primary cyclone vessel unit for separating dusts from dust containing air, and one or more secondary cyclone vessel units for separating dusts from the air passing through the primary cyclone vessel unit, the secondary cyclone vessel units being arranged to surround at least a part of the primary cyclone vessel unit; and a dirt collection bin for receiving dusts or the like separated by the cyclone vessel main-body, wherein the cyclone vessel main-body has an outer circumference with a non-constant radius. Therefore, the cyclone vessel dust collector can have a dust collection capability of large capacity with a small size.

30 Claims, 10 Drawing Sheets

FOREIGN PATENT DOCUMENTS

| | | |
|---|---|---|
| GB | 2360719 | 10/2001 |
| GB | 2381484 | 5/2003 |
| JP | 52-014775 | 2/1977 |
| JP | 5214775 | 8/1993 |
| JP | 2002 51947 | 2/2002 |
| KR | 010081856 | 8/2001 |
| WO | WO00/74548 | 12/2000 |
| WO | WO 0074548 | 12/2000 |
| WO | WO01/60226 | 8/2001 |
| WO | WO 0160226 | 8/2001 |
| WO | WO01/95780 | 12/2001 |
| WO | 02 067756 | 9/2002 |

OTHER PUBLICATIONS

Official Action from the German Patent and Trademark Office Apr. 3, 2007.

First Notice of Office Action from the Intellectual Property Office of China Apr, 6, 2007.

* cited by examiner

CYCLONE VESSEL DUST COLLECTOR AND VACUUM CLEANER HAVING THE SAME

FIELD OF THE INVENTION

The present invention relates to a vacuum cleaner. More particularly, the present invention relates to a cyclone vessel dust collector.

BACKGROUND OF THE INVENTION

Cyclone vessel dust collectors, which remove dirt, dusts or the like using one or more cyclone vessel, are well known in the prior art. It is also well known that in a vacuum cleaner, multiple cyclone vessels are more effective in removing dirt and dusts than a single cyclone vessel.

Configurations for cyclone vessel dust collectors having multiple cyclone vessels, in which a primary cyclone vessel first separates relatively coarse dusts or dirt and then a secondary cyclone vessel separates fine dusts, are disclosed in U.S. Pat. No. 3,425,192, U.S. Pat. No. 4,373,228, etc. Recently, however, various other types of cyclone vessel dust collectors such as those described in GB 2 360 719 and WO 02/067755 have been disclosed.

For example, the cyclone vessel dust collector described in U.S. Pat. No. 3,425,192 is comprised of a primary cyclone vessel and five secondary cyclone vessels arranged above the primary cyclone vessel and parallel to the primary cyclone vessel. A dirt collection bin receives dirt separated in the first cyclone vessel. An separate area for collecting or receiving dusts separated by the secondary cyclone vessels is isolated from the dirt collection bit that receives dirt separated in the first cyclone vessel. In addition, the second cyclone vessels have their own respective separate inlets that are configured in such a way that each of the inlets guides air to one corresponding secondary cyclone vessel. Such prior art cyclone vessel dust collectors are large. Their size limits their use to industrial applications. In addition, such prior art cyclone vessel dust collectors are expensive to manufacture and repair.

More recently, attempts have been made to miniaturize multi-cyclone vessel dust collectors, reduce their manufacturing cost reduce their repair and maintenance cost, and to facilitate their domestic, i.e., residential use, where they can used to remove dirt, dusts or the like from cleaning surfaces.

For example, the cyclone vessel dust collector disclosed in GB 2 360 719 is configured in such a way that plural secondary cyclone vessels are inserted into a primary cyclone vessel chamber. This cyclone vessel dust collector can somewhat reduce the height of the apparatus. However, such a cyclone vessel dust collector has at least one disadvantage in that the space for the primary cyclone vessel chamber is reduced and the entire dust collection space is narrowed. Thus, the dust collection capacity is significantly reduced. The device is also difficult to repair and maintain.

In addition, the cyclone vessel dust collector disclosed in WO 02/067755 comprise a primary cyclone vessel and plural secondary cyclone vessels installed above the primary cyclone vessel, wherein an inlet/outlet unit formed by a separate member is interposed between the primary cyclone vessel and the plural secondary cyclone vessels. A lower end plate of the cyclone vessel dust collector is arranged to be capable of being opened and closed in such a way that if a lever provided on a handle on the top of the cyclone vessel dust collector is compressed, the lower end plate can be opened, thereby allowing collected dusts to be dumped. Because of how the secondary cyclone vessels are arranged above the primary cyclone vessel, the entire height of the apparatus is very high and the secondary cyclone vessels are tilted. In addition, the device is inconvenient to dump collected dusts because the entire device must be moved a place where it can be emptied.

SUMMARY OF THE INVENTION

In light of the foregoing, an object of the present invention is to provide a cyclone vessel dust collector having a reduced size while having a large dust collection capacity.

Another object of the present invention is to provide a cyclone vessel dust collector capable of being easily repaired and maintained with good assemblability.

Still another object of the present invention is to provide a cyclone vessel dust collector, in which dusts or dirt removed by plural cyclone vessel units can be easily and simultaneously dumped.

Yet another object of the present invention is to provide a vacuum cleaner which has a large dust collection capacity as compared to its size and which can be easily repaired and maintained.

In order to achieve at least the foregoing objects, there is provided a cyclone vessel dust collector comprising a cyclone vessel main-body including a primary cyclone vessel unit for separating dusts from dust containing air, and one or more secondary cyclone vessel units for separating dusts from the air passing through the primary cyclone vessel unit. In at least one preferred embodiment, the cyclone main body has an outer circumference with a non-constant radius, and the secondary cyclone vessel units are arranged to surround at least a part of the primary cyclone vessel unit. A dirt collection bin receives dust separated in the cyclone vessel main-body. The outer circumference of the cyclone vessel main-body has a first wall and a second wall having a radius larger than that of the first wall.

The cyclone vessel main-body includes a primary cyclone vessel unit for separating dusts from drawn in air, and one or more secondary cyclone vessel units for separating dusts from the air passing through the primary cyclone vessel unit, and a dirt collection bin for receiving dusts or the like separated in the cyclone vessel main-body. The cyclone vessel main-body has an outer circumference with a non-constant radius. With this arrangement, it is possible to construct the dust collector in a compact size while increasing the size of the chamber of the primary cyclone vessel unit.

The secondary cyclone vessel units may be arranged to surround about a half of the outer circumference of the primary cyclone vessel unit. In particular, there may be provided up to nine secondary cyclone vessel units.

BRIEF DESCRIPTION OF THE DRAWINGS

The above and other objects, features and advantages of the present invention will be more apparent from the following detailed description taken with reference to the accompanying drawings, in which.

DETAILED DESCRIPTION OF THE PREFERRED EMBODMIMENTS

Figure 1:
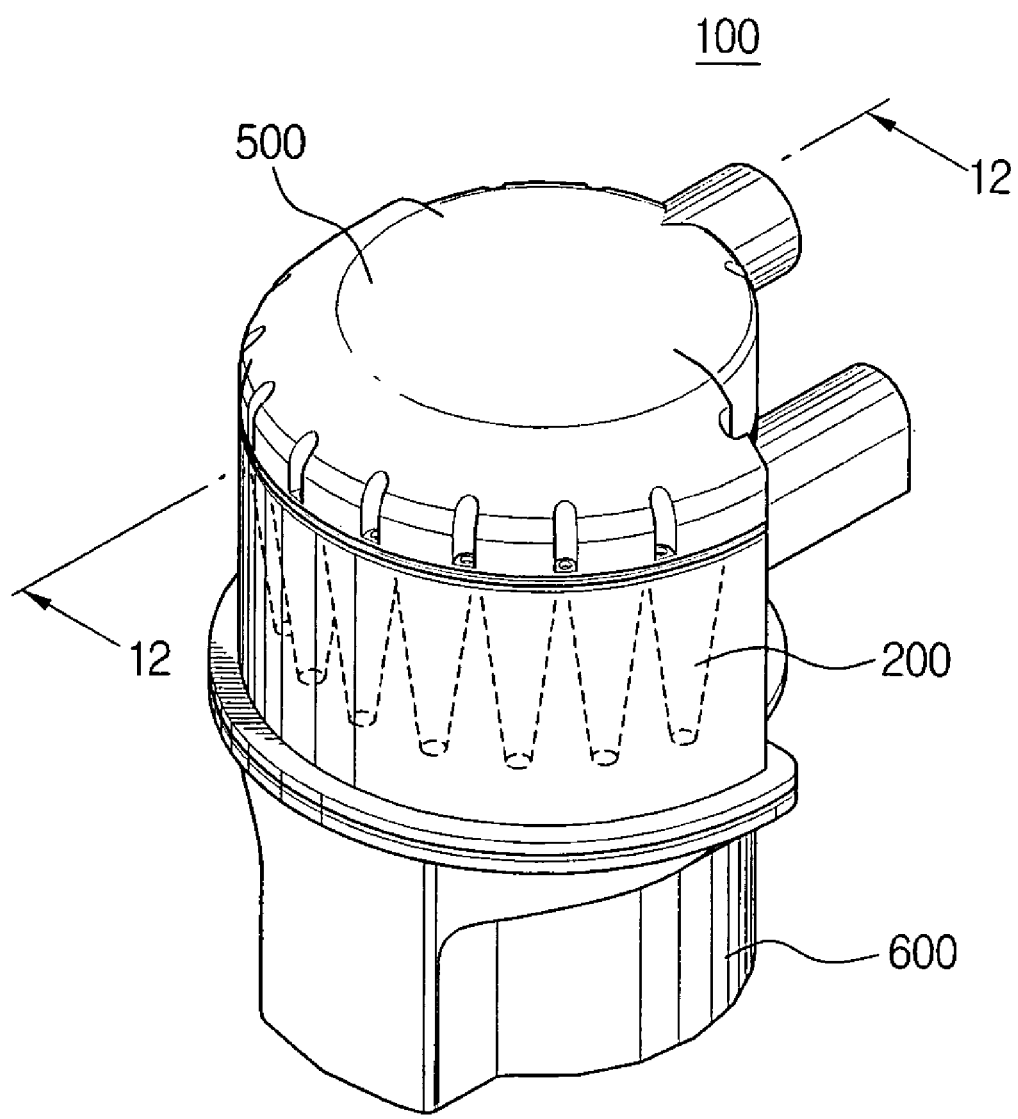
FIG. 1 is a perspective view of a cyclone vessel dust collector according to at least one preferred embodiment of the present invention.

Certain embodiments of the present invention will be described in greater detail with reference to the accompanying drawings.

In the following description, drawing reference numerals are used for the same elements even different drawings. The embodiments described herein are only examples and are not intended to limiting the invention disclosed herein. Rather, the invention disclosed herein is defined by set forth in the appurtenant claims. Also, well-known functions or constructions are not described in detail since they would obscure the invention in unnecessary detail.

Figure 2:
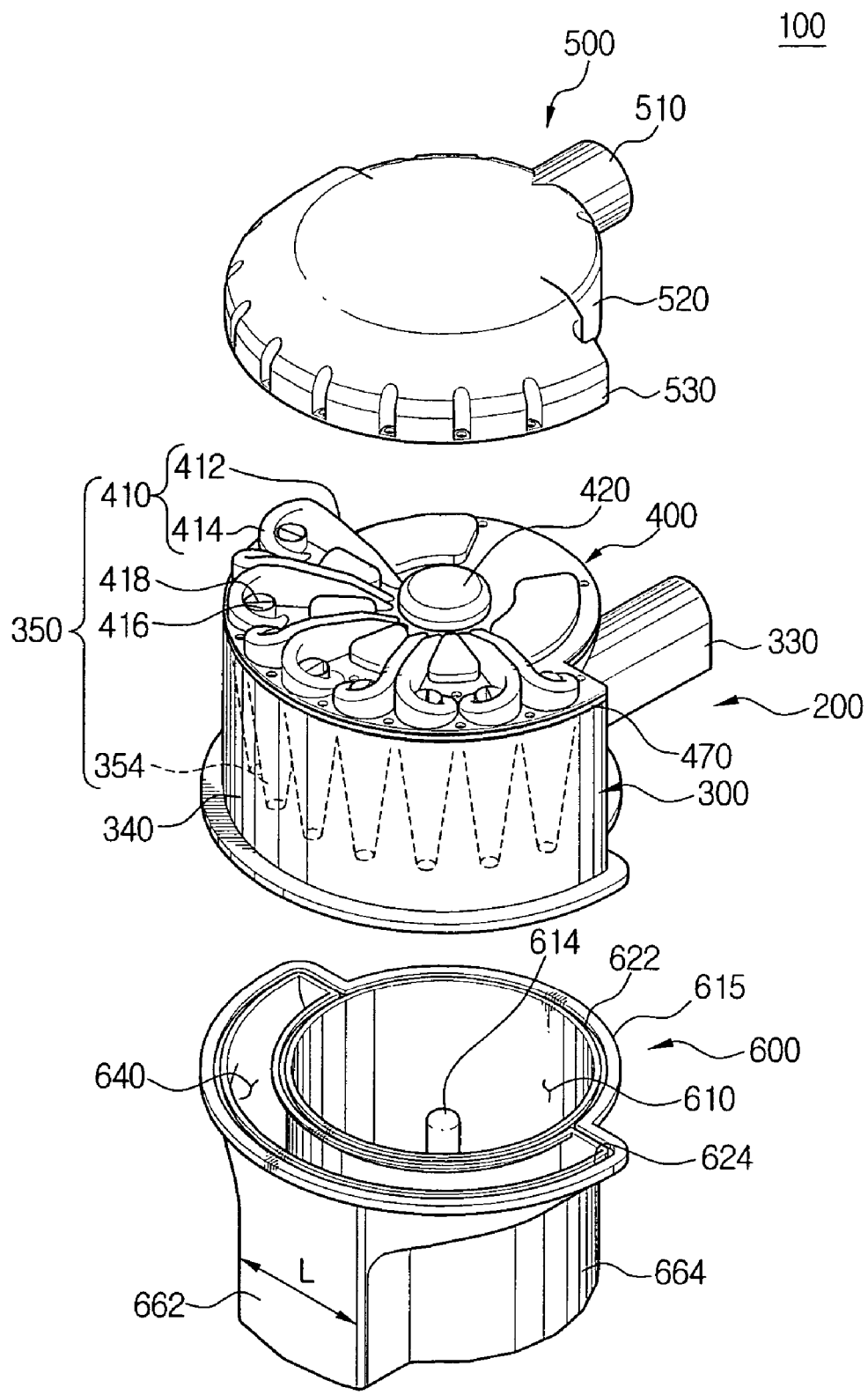
FIG. 2 is an exploded perspective view of the cyclone vessel dust collector shown in FIG. 1.
Figure 3:
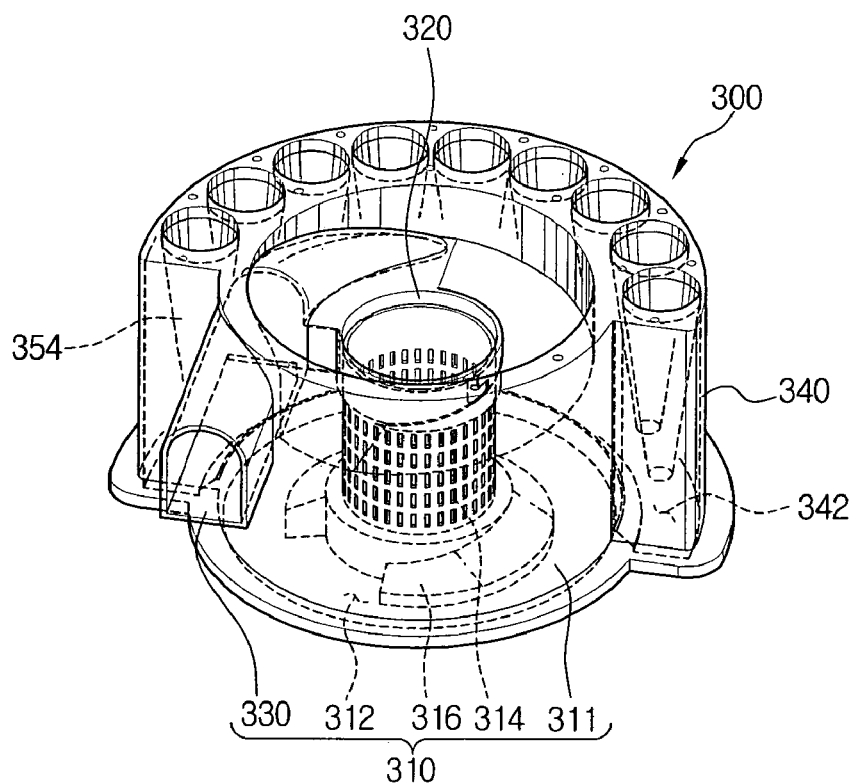
FIG. 3 is a schematic view showing the body unit of the cyclone vessel dust collector shown in FIG. 1.

FIGS. 1 to 3 are perspective and exploded perspective views showing an embodiment of the inventive cyclone vessel dust collector. As shown in FIG. 1. and FIG. 2, the cyclone vessel dust collector 100 of the present embodiment comprises a cyclone vessel main-body 200, a dirt collection bin 600 below the main body 200 and a cover 500 over the main body 200.

As shown in FIG. 2 and FIG. 3, the cyclone vessel main-body 200 includes a primary cyclone vessel unit 310 (See FIG. 3.) and multiple secondary cyclone vessel units 350 (See FIG. 2.).

A cover 500 is assembled to the top of the cyclone vessel main-body 200 (See FIG. 2) and a dirt collection bin 600 is assembled to the bottom of the cyclone vessel main-body 200. (See FIG. 2.) In addition, the cyclone vessel main-body 200 comprises an external wall (i.e., the outer circumference) which consists of a first wall 311 with a first radius and a second wall 340 with a second radius greater than that of the first wall 311, such that the external wall comprised of the first wall 311 and the second wall 340 provide a non-uniform external wall with a first section (311) of a first radius and a second section (340) with a second, greater radius.

Figure 4:
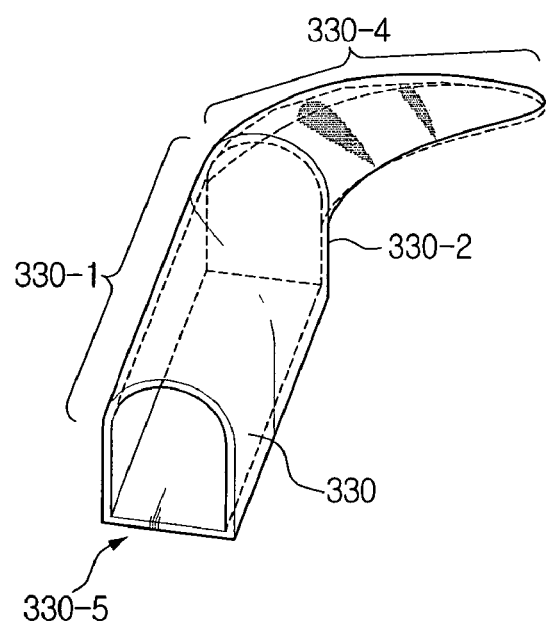
FIG. 4 is a schematic view showing the inlet flow passage of the cyclone vessel dust collector shown in FIG. 1.

Referring to FIGS. 2 and 3, the primary cyclone vessel unit 310 is enclosed in a cyclone vessel body unit 300. The body unit 300 has a first inlet 330, a first outlet 320, a filter unit 314, and a first chamber 312. As can be seen in FIG. 4, which provides an isolated view of the first inlet 330, the first inlet 330 has a straight section 330-1, the terminal end of which 330-2 opens into a curved section 330-4 from which the air flowing therein is helically curved along the inner surface of the first wall 311. As can be seen from FIG. 4, the front end 330-5 of the first inlet 330 takes the form of a substantially rectangular cross-section with a domed top side. From the terminal end 330-2 of the first inlet 330, the cross-sectional area of the first inlet 330 gradually decreases and turns along a radius substantially equal to the inner surface of the first wall 311. A substantially cylindrically-shaped first outlet 320 is located at the center of a first chamber 312, which is a space formed by the first wall 311.

Figure 5:
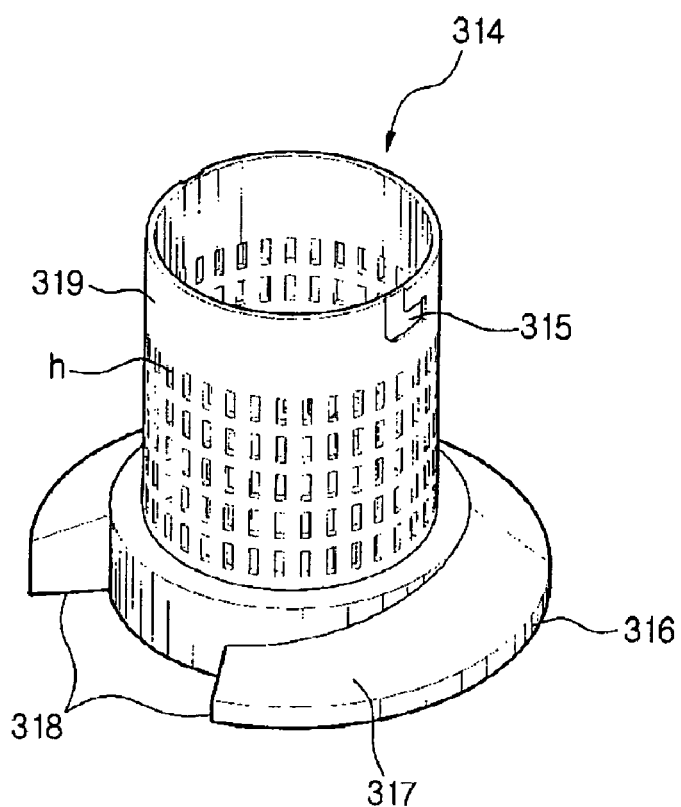
FIG. 5 is a perspective view showing the filter unit of the cyclone vessel dust collector shown in FIG. 1.
Figure 12:
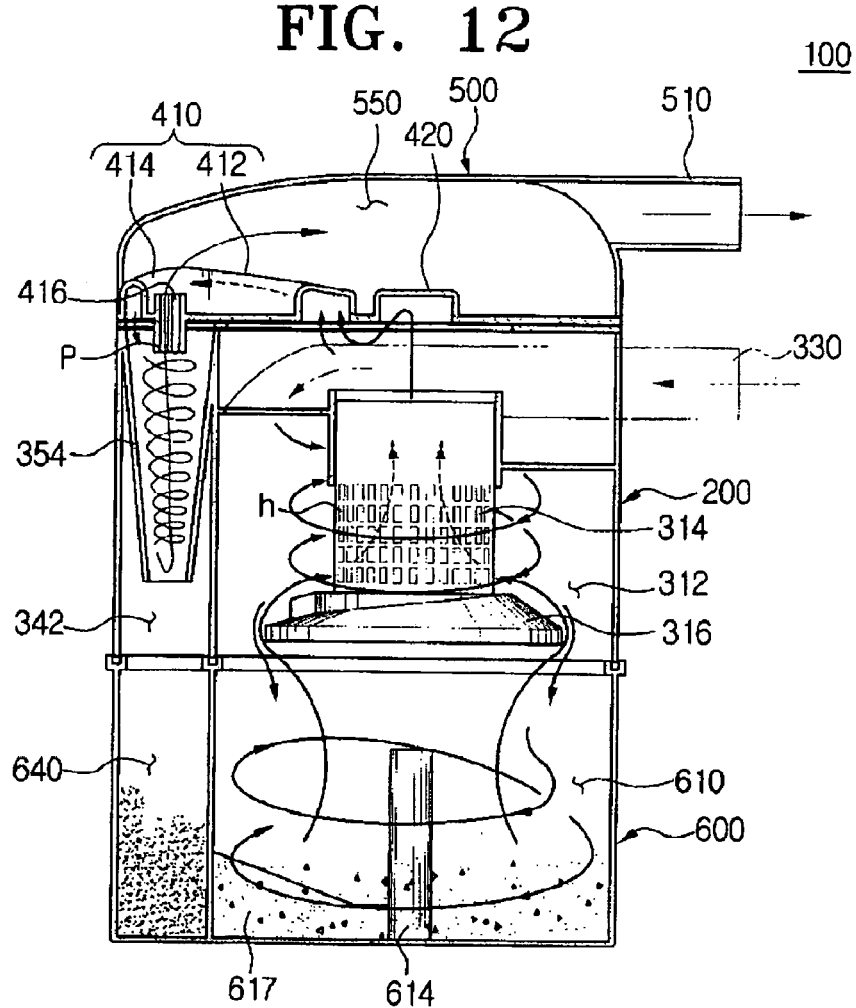
FIG. 12 is a cross-sectional view taken along the line 12-12 of FIG. 1.

Referring to FIGS. 4, 5 and 12, a filter unit 314 is installed at the bottom of the first outlet 320. Air drawn into the first inlet 330 rotates or curls around the inner surface of the first wall 311 and produces a cyclonic wind, thereby causing dust in the air to experience a centrifugal force that separates suspended dust particles within the first chamber 312. The cyclonic-flowing air is drawn through the filter unit 314, travels vertically or upwardly is then discharged from the first outlet 320 of the filter unit 314.

As can be seen in FIG. 5, the filter unit 314 has a filter body 319 and a downwardly tapered and sloping anti-backflow member 316 located at the bottom of the filter body 319. As can be seen in more detail from FIG. 5, numerous small holes "h" extend through the filter body 319 wall. A "L" shaped locking groove 315 at the top of the filter body 319 is sized and shaped to accept a complementary and mating locking projection (not shown) formed on the first outlet 320 in the circumferential direction.

The anti-backflow member 316 is preferably integrally molded with the filter body 319 although at least one alternate embodiment uses an anti-back flow member 316 that is separately molded and sized, shaped and arranged to engage the filter body 319. As shown in FIG. 5, part of the anti-backflow member 316 has a downwardly inclined part 317, ends of which form a cutoff part 318. The anti-backflow member 316 is substantially "C-shaped" when it is viewed from the top.

Many dust particles are removed from the cyclonic wind in the first chamber 312 by centrifugal force. Larger particles that are not separated by centrifugal force are filtered when the air that carries them passes through the fine holes "h" of the filter body 319.

Referring again to FIG. 2, several cone-shaped secondary cyclone vessel units 350 are arranged to surround almost half of the external wall of the primary cyclone vessel unit 310 (see FIG. 2). Each of the secondary cyclone vessel units 350 comprises a second inlet 410, a second outlet 416, and a second cyclone vessel body 354. As can be seen in the figure, the cross-section of each of the cone-shaped second cyclone vessel bodies 354 decreases as approaches its lower end.

Figure 6:
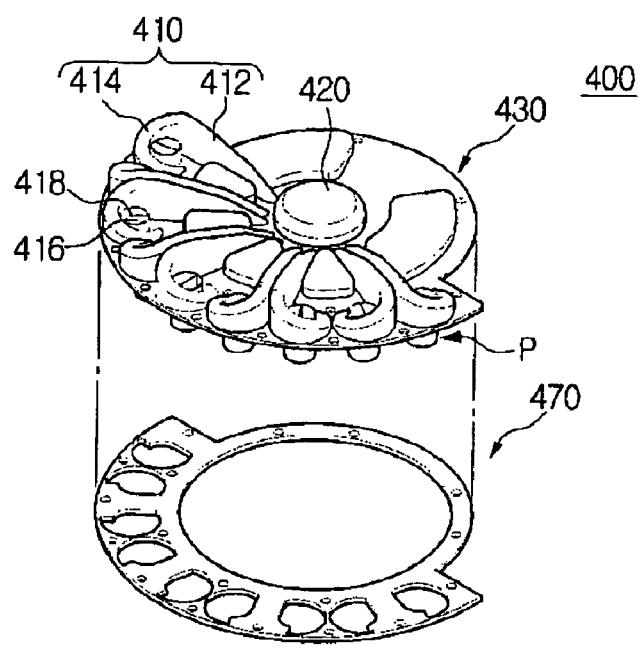
FIG. 6 is an exploded perspective view showing the inlet/outlet unit of the cyclone vessel dust collector shown in FIG. 2.
Figure 7:
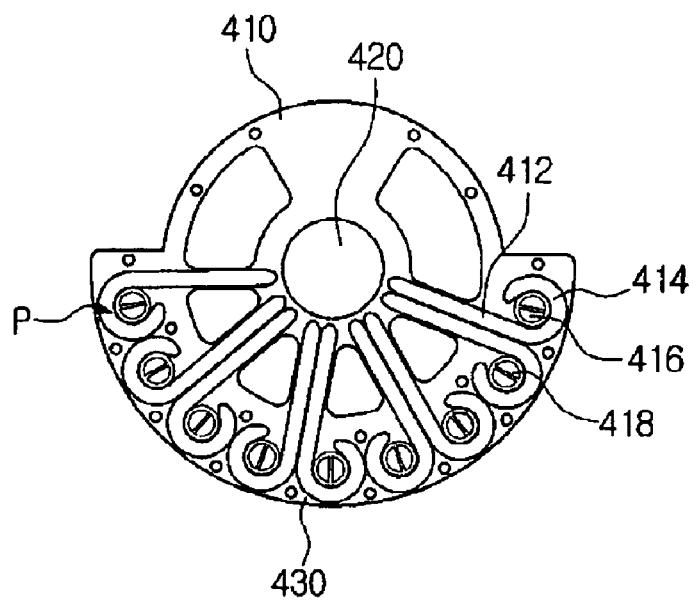
FIG. 7 is a top plan view of the inlet/outlet unit shown in FIG. 6.
Figure 8:
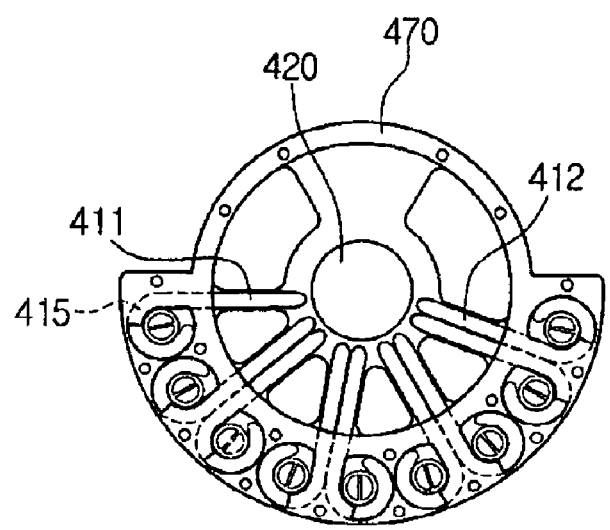
FIG. 8 is a bottom view of the inlet/outlet unit shown in FIG. 6.

As shown in FIG. 6, FIG. 7 and FIG. 12, each of the second inlets 410 of a secondary cyclone vessel unit 350 has a substantially linear part 412 that extends from the top of the filter unit 314. The linear part 412 flows into a curved part 414 by which air flowing into the second inlet 410 changes its direction as it is turned downwardly to flow through the curved second part 414 into a corresponding second cyclone vessel body 354, as shown in FIG. 2.

Each of the second outlets 416 of a secondary cyclone vessel unit 350 is formed at the center of the curved part 414 of a corresponding second inlet 410. A plate 418 is provided at the center of each of the second outlets 416 to stabilize the discharged air.

The second inlets 410 and the second outlets 416 of each of the cone-shaped second cyclone vessel bodies 354 are integrally formed with each other on an inlet/outlet unit 400. The inlet/outlet unit 400 consists of an inlet/outlet member 430 and a gasket member 470.

By arranging the several secondary cyclone vessel units 350 around the outer circumference of the primary cyclone vessel unit 310, additional cyclonic filtration stages can be added while keeping the height of the cyclone vessel dust collector 100 minimized. With the foregoing in mind, those of ordinary skill in the art will recognize that if the cyclone vessel main-body 200 comprises a first wall 311 with a first radius and a second wall 340 with a second radius larger than that of the first wall 311, thus forming a non-uniform contour, cyclonic dust collection efficiency can be enhanced and the entire volume for installing such a cyclone vessel dust collector can be saved when it is installed in a vacuum cleaner.

Referring again to FIG. 3, the body unit 300 comprises a primary cyclone vessel unit 310 and plural second cyclone vessel bodies 354, which, in the preferred embodiment, are integrally formed with each other by injection molding techniques, well-known to those of ordinary skill in the art of injection molding. Those of ordinary skill in the injection molding art will recognize however that the body unit 300 can also be assembled from two or more separate and independently injection-molded parts which are then assembled together after being molded.

As can be seen in FIG. 3, the body unit 300 comprises a first chamber 321 having an exterior wall that is defined substantially by the first wall 311. A second chamber 342 that receives the second cyclone vessel bodies is substantially defined by the second wall 340. The first chamber 312 and the second chamber 342 are partitioned into separate spaces by the first wall 311. With this arrangement, it is possible to prevent fine dusts separated in the secondary cyclone vessel units 350 from flowing into the first chamber 312 of the primary cyclone vessel unit 310 and then into the secondary cyclone vessel units 350 again.

Referring to FIGS. 6 to 8 and FIG. 12, the inlet/outlet unit 400 is formed by assembling two separate members, i.e., an inlet/outlet member 430 and a gasket member 470. As can be seen from FIG. 8 and FIG. 12, the second inlets 410 form a complete inlet flow passage when they are assembled with a gasket member 470 at the bottom surface of the inlet/outlet member 430. That is, air flowing from the first outlet 330 of the primary cyclone vessel unit 310 runs into an air receiving section 420, passes through opened sections 415 of the linear parts 212 of the second inlets 410, turns along closed sections 415 of the linear parts 212 covered by the gasket member 470, and then enters the second cyclone vessel bodies 354. (See FIG. 2, FIG. 6 and FIG. 12.)

Referring to FIGS. 6, 7. and 12, the second outlets 416 are provided at the centers of the curved parts 414 of the second inlets 410, respectively, in which a pipe "P" is provided in each of the second outlets in such a way that the pipe member P extends above and below the inlet/outlet member 430 as shown in FIG. 12. The gasket member 470 is interposed between the inlet/outlet member 430 and the body unit 300, thereby serving to seal the gap between the inlet/outlet member 430 and the body unit 300 beyond finishing the flow passages of the second inlets 416 as described above.

Figure 9:
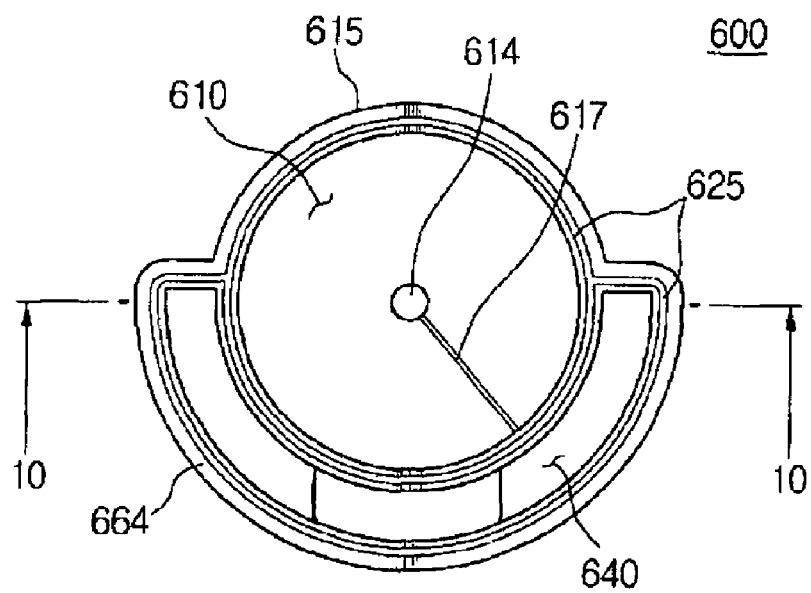
FIG. 9 is a top plan view of the dirt collection bin shown in FIG. 2.

Referring to FIGS. 2, 9, 10 and 12, a dirt collection bin 600 comprises a first dust collection chamber 610 and a second dust collection chamber 640. The first dust collection chamber 610 is cylindrical. As best shown in FIG. 2 and FIG. 9, the second dust collection chamber 640 is a partial annulus, formed to surround apart of the outer circumference of the first dust collection chamber 610. It is connected to a side of the first dust collection chamber 610. The inner circumference of the second dust collection chamber 640 is defined by a third wall 615 that also defines the circumference of the first dust collection chamber 610. The outer circumference of the second dust collection chamber 640 is determined by a fourth wall 664 with a diameter larger than that of the third wall 615.

As best seen in FIG. 2, the fourth wall 664 includes a protrusion or raised part 662, which extends outwardly and away from the dust collection bin 600 and which can be used as a handle for a user. The raised part 662 has a width L that is substantially narrower than the span of a hand of an ordinary adult thus allowing the dust collection bin 600 to be easily grasped.

Figure 10:
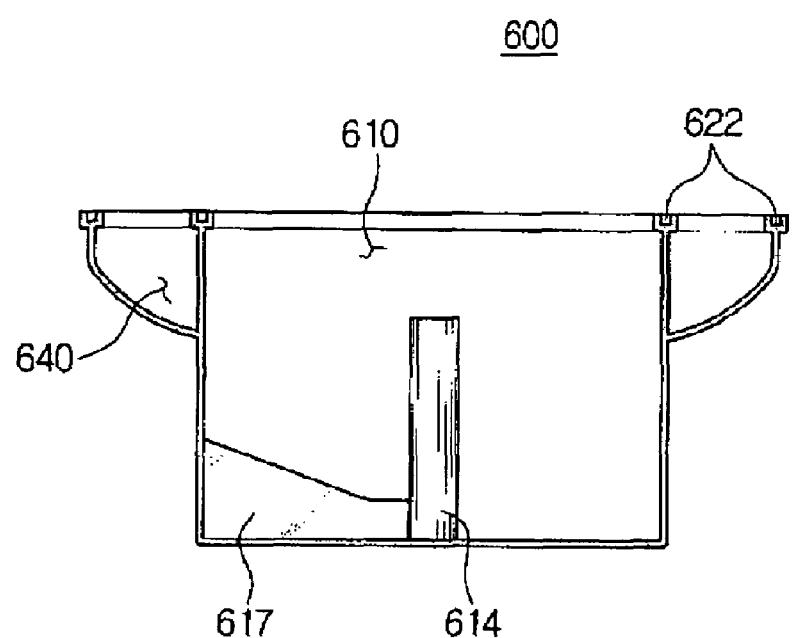
FIG. 10 is a cross-sectional view taken along the line 10-10 of FIG. 9.

As can be seen in FIG. 12, when the dirt collection bin 600 is installed to the bottom of the body unit 300, the first dust collection chamber 610 is in fluid communication with the first chamber 312. The second dust collection chamber 640 is communicated with the second chamber 342. As can be seen in FIG. 10, which is a sectional view of the dust collection bin 600 as shown in FIG. 9 but taken through section lines 10-10, the top of the dirt collection bin 600 is formed with grooves 622 that are sized and shaped to accept a gasket or sealing member 625, the location of which is shown in FIG. 9. When a gasket or sealing is inserted into the grooves 622 and the dust collection bin 600 is attached to the body unit 300, the gasket/sealing member 625 provides a substantially air-tight seal. (See FIG. 12.)

As can be seen in FIGS. 2, 9, 10 and 12, the first dust collection chamber 610 is provided with a central shaft 614 and a separation membrane 617. The central shaft 614 provides a rotation center for the cyclonic air currents that can develop in the dust first dust collection chamber 610. The separation membrane 617, however, serves to suppress or impede cyclonic air rotation or turning at the bottom of the first dust collection chamber 610, so as to prevent or control dust particles that lie at the bottom of the chamber 610 from being lifted by cyclonic air currents.

Figure 11:
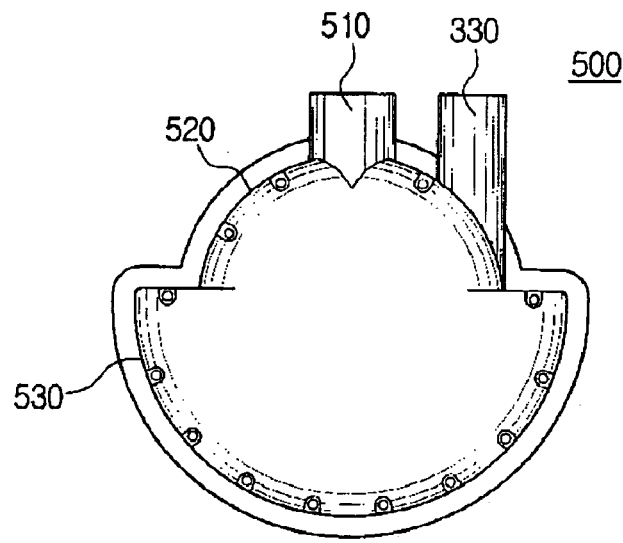
FIG. 11 is a top plan view of the cyclone vessel dust collector shown in FIG. 1.

Referring now to FIGS. 2, 11 and 12, a cover 500 is mounted on the top of the cyclone vessel main-body 200 to enclose the top of the input/output unit 400. A pipe-shaped outlet 510 is formed to project sideways on a "side" of the cover 500 as shown in FIG. 11. Clean air escaping from the second outlets 416 is collected in the cover chamber 550 (See FIG. 12.) of the cover 500 and discharged through the cover outlet 510. As can be seen in FIGS. 2 and 11, the outer circumference of the cover 500 that is defined by the sixth wall 530, is segmented or "divided" by a fifth wall 520 having a radius less than the sixth wall 530.

Operation of the cyclone vessel dust collector 100 as described above is hereinafter described in detail with respect to the various figures.

Referring to FIG. 12, the surrounding air, which enters the first inlet 330 with dirt, dusts or the like contained in the air, flows into the first chamber 312 of the primary cyclone vessel unit 310 while turning along a semicircular passage provided by the curved section 330-4 that begins at the terminal end 330-2 of the straight section 330-1 of the first inlet 330, as shown in FIG. 5. Heavy dirt, coarse dusts or the like are dropped downwardly from the inflow air by centrifugal force and finally dropped into the bottom of the first dust collection chamber 610 communicated with the first chamber 312. The air, from which dirt, dusts, etc., are removed to some extent, passes through the fine holes h of the filter unit 314, whereby the dusts, dirt, etc. coarser than the fine holes are filtered again.

The anti-backflow member 316 of the filter unit 314 shown in FIG. 5 and FIG. 12, acts to hinder dirt particles lying at the bottom of the first dust collection chamber 610 from being lifted by cyclonic air streams.

Air that passes through the filter unit 314, runs into the air receiving section 420 and disperses in all directions and then flows into the second inlets 410. Air that flows into the second inlets is cyclonically rotated again while passing the linear parts 412 and the curved parts 414 of the second inlets 410 causing fine dusts to drop into the second dust collection chamber 640. Air that is filtered in this manner flows through the second outlets 416 of the secondary cyclone vessel units 350 and into the cover chamber 550 from where it is discharged through the cover outlet 510.

Because the cyclone vessel dust collector 100 as described above is arranged in such a way that the secondary cyclone vessel units 350 surround the outer circumference (external wall) of the primary cyclone vessel unit 310, multiple cyclonic flows can be created while keeping the height of the cyclone dust collector 100 minimized.

Figure 13:
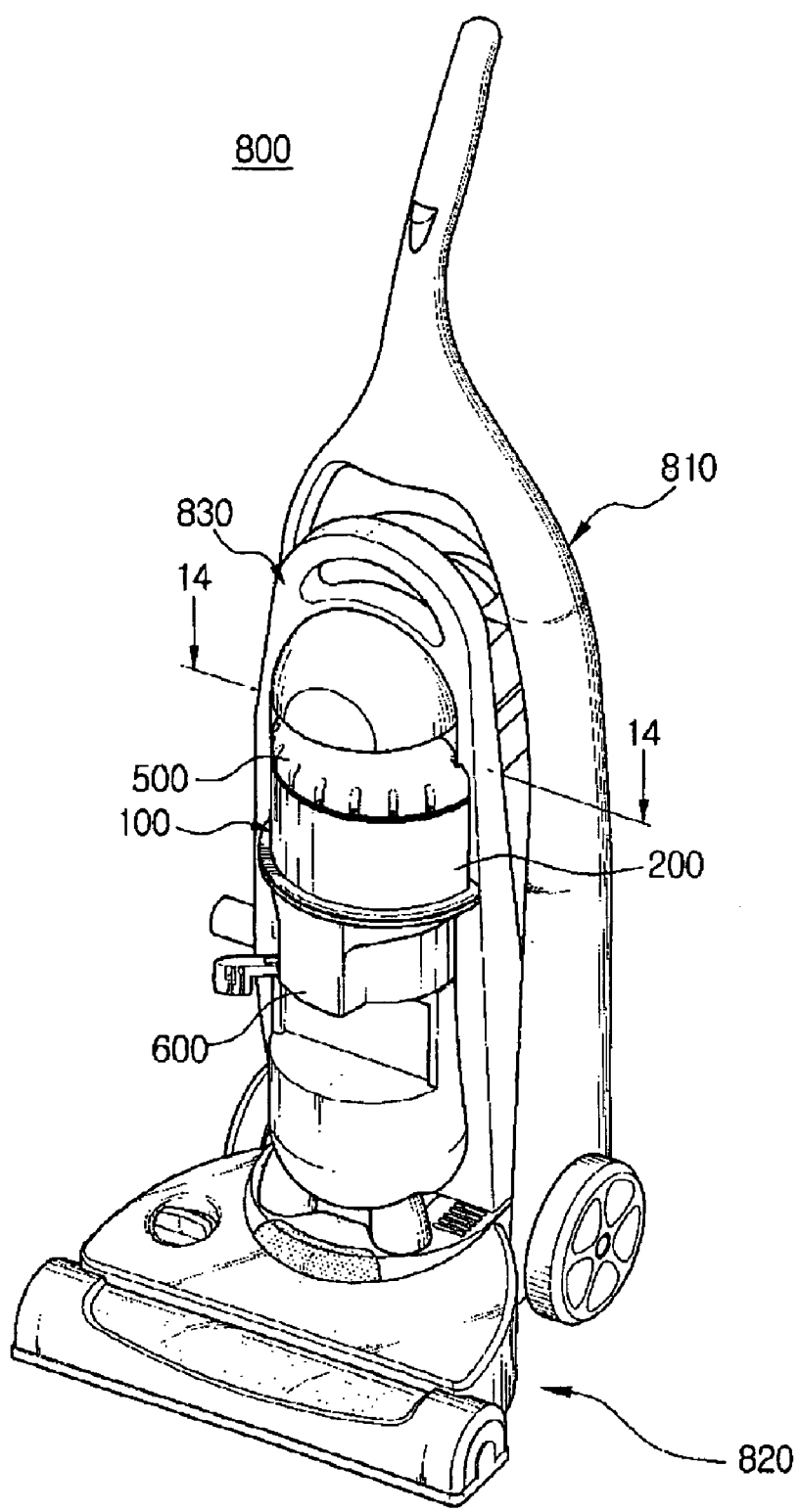
FIG. 13 is a perspective view showing an embodiment of the inventive vacuum cleaner.
Figure 14:
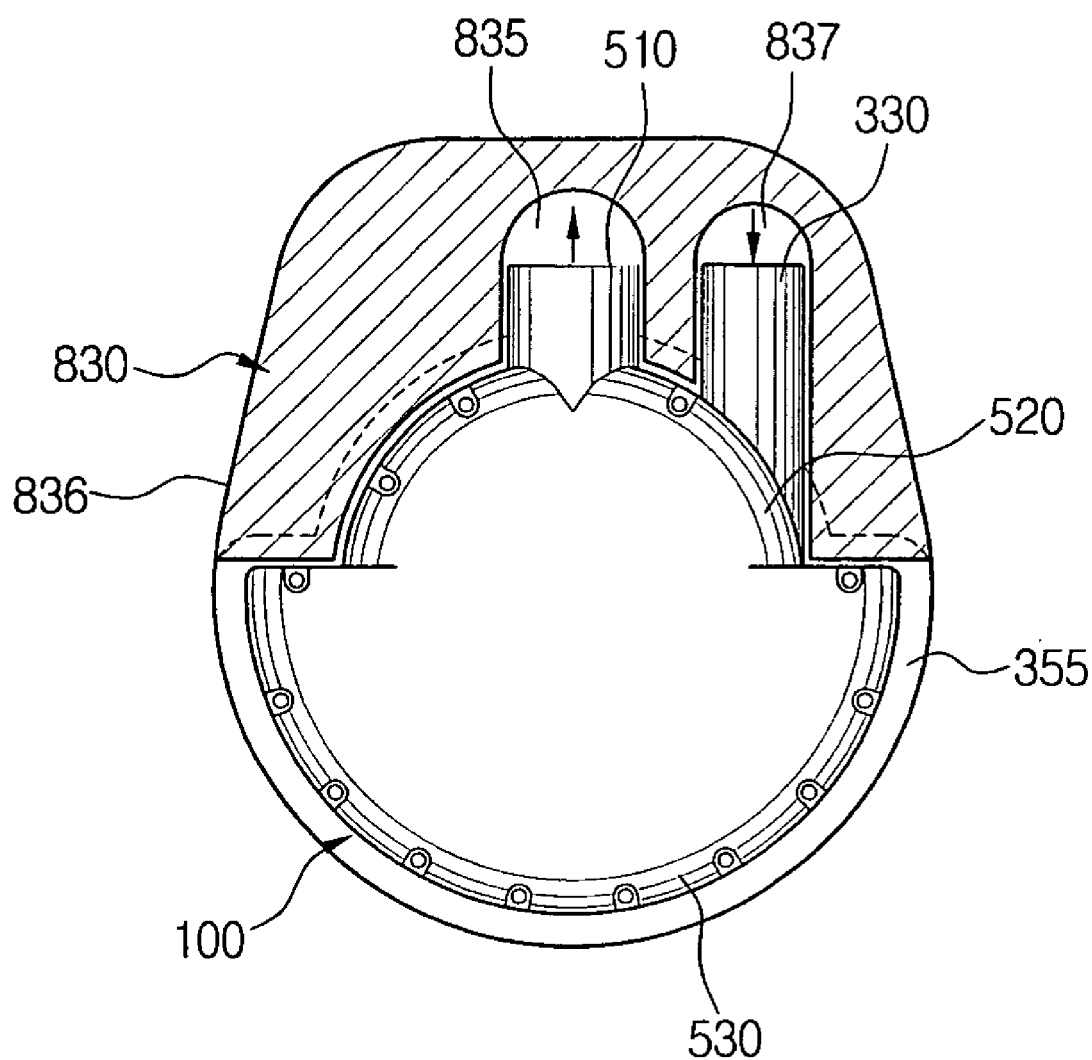
FIG. 14 is a cross-sectional view taken along the line 14-14 of FIG. 13.
Figure 15:
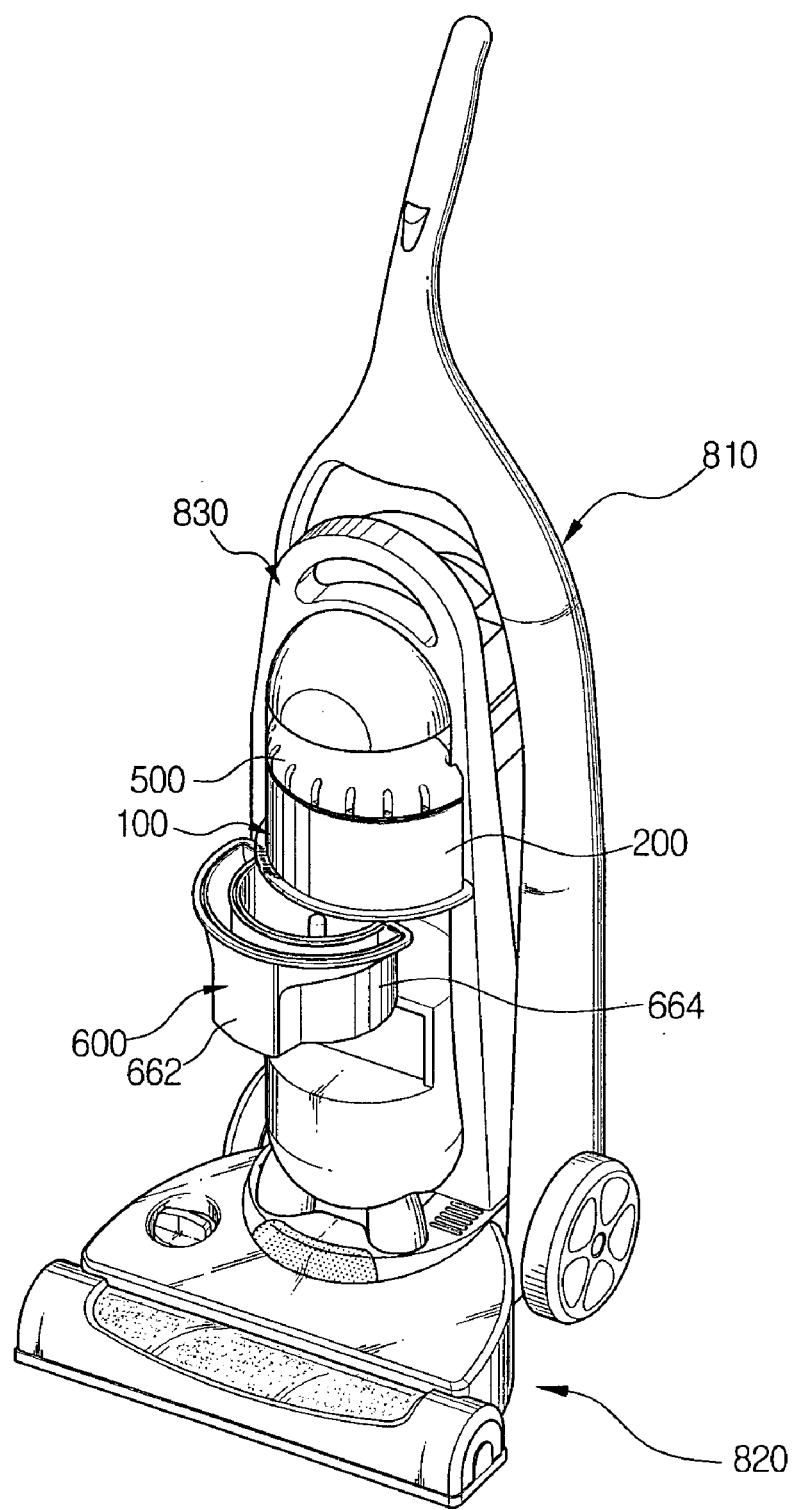
FIG. 15 is a perspective view for describing an operation for separating the dirt collection bin from the vacuum cleaner of FIG. 13.

FIG. 13 is a perspective view showing an embodiment of a vacuum cleaner 800, in which the aforementioned cyclone vessel dust collector 100 is used. FIG. 14 is a cross-sectional view of the vacuum cleaner 800 taken along the section line 14-14 of FIG. 13. FIG. 15 shows how the dirt collection bin is installed into and removed from the vacuum cleaner 800.

The vacuum cleaner 800 shown in FIGS. 13 and 15 is commonly known as an "upright" cleaner. However, the present invention is not limited to use in such upright vacuum cleaners and those of ordinary skill in the art will recognize that cyclone dust collector 100 can be applied to other types of cleaners such as canister cleaner.

Referring to FIGS. 13 to 15, the vacuum cleaner 800 comprises a brush assembly 820, a vacuum cleaner body 830, the cyclone vessel dust collector 100, and a cleaner frame 810. As shown in FIG. 13, the cyclone vessel dust collector 100 is installed in the vacuum cleaner body 830. That is, as can be seen from FIG. 14, the fifth wall (FIG. 2) of the cover 500 of the cyclone vessel dust collector 100, the first wall 311 (FIG. 3) of the cyclone vessel main-body 200 and the third wall 615 of the first dust collection chamber of the dirt collection bin 600 (FIG. 9) are partially inserted into the vacuum cleaner body 830, and the sixth wall 530 of the dirt collection bin 600, the second wall 340 (FIG. 3) of the cyclone vessel main-body 200, and the fourth wall 664 (FIG. 9) of the second dust collection chamber 640 of the dirt collection chamber 600 outwardly project.

Referring to FIG. 14, a projection 355 extending from the lower end of the body unit 300 of the dust collector 100 is substantially flush with the outer circumference of the vacuum cleaner body 630. Accordingly, it is possible to reduce the size of the vacuum cleaner body 830 while increasing the dust collection capacity of the cyclone vessel dust collector 100. In operation, the first inlet 330 of the cyclone vessel dust collector 100 is inserted into a first opening 837 of the vacuum cleaner body 830 and in fluid communication with a suction port (not shown) formed in the brush assembly 820 to draw in surrounding air. In addition, the cover outlet 510 is inserted into a second opening 835 of the vacuum cleaner body 830, connected to a vacuum source (not shown) of the cleaner and in fluid communication with an air discharge port (not shown) of the vacuum cleaner. Because the other components are same with those generally known in the art, the description thereof is omitted.

With the vacuum cleaner 800 constructed in this manner, when the vacuum source (not shown) provided in the vacuum cleaner body 830 is operated, surrounding air is introduced into a suction port (not shown) of the brush assembly 820 and then into the first inlet 330 connected to the first opening 837 of the vacuum cleaner body 830. As the drawn-in air passes the primary cyclone vessel unit 310 (FIG. 3), coarse dusts or dirt are removed from the air and the air is introduced into the secondary cyclone vessel units 350 through the first outlet 320. The secondary cyclone vessel units 350 remove fine dusts or the like and then discharges purified air through the second outlets 416 and the cover outlet 510 to the discharge port (not shown) of the vacuum cleaner. The dusts or dirt separated in this manner are accumulated in the first dust collection chamber 610 and the second collection chamber 640 of the dirt collection bin 600. Therefore, the user can grip and simply separate the raised part 662 of the dirt collection bin 600 and dump the dirt collected in the first dust collection chamber 610 and the dusts in the second dust collection chamber 640 at the same time.

While the preferred embodiments of the present invention have been shown and described with reference to the representative embodiments thereof in order to exemplify the principle of the present invention, the present invention is not limited to the embodiments. It will be understood that various modifications and changes can be made by those skilled in the art without departing from the spirit and scope of the invention as defined by the appended claims. Therefore, it shall be considered that such modifications, changes and equivalents thereof are all included within the scope of the present invention.

What is claimed is:

1. A cyclone vessel dust collector comprising:
   a cyclone vessel main-body including a primary cyclone vessel unit for separating dusts from drawn in air, the primary cyclone vessel having an outer circumference, the cyclone vessel main body having a first wall having a first radius such that the first wall surrounds the outer circumference of the primary cyclone vessel, the cyclone vessel main body further having a second wall having a second radius that is greater than the first radius such that the second wall surrounds the first wall and defines a chamber between the first wall and second wall wherein there are
   three or more secondary cyclone vessel units for separating dusts from air passing through the primary cyclone vessel unit, the secondary cyclone vessel units being around the outer circumference of the primary cyclone vessel; and
   a dirt collection bin for receiving dust separated from drawn-in air, wherein the cyclone main body has an outer circumference with a non-constant radius.

2. A cyclone vessel dust collector as claimed in claim 1, further comprising: a cover mounted on the top of the cyclone vessel main-body.

3. A cyclone vessel dust collector as claimed in claim 2, wherein the cover comprises: a cover outlet and a cover chamber for accumulating the air discharged from the secondary cyclone vessel units.

4. A cyclone vessel dust collector as claimed in claim 1, wherein the secondary cyclone vessel units are arranged to surround at least a part of the primary cyclone vessel unit.

5. A cyclone vessel dust collector as claimed in claim 1, wherein there are provided nine secondary cyclone vessel units.

6. A cyclone vessel dust collector as claimed in claim 1, wherein the primary cyclone vessel unit comprises:
- a first air inlet;
- a first air outlet;
- a cyclonic air filter unit provided on the airflow passage, operatively coupled to both the first inlet and the first outlet; and
- a first chamber for receiving the filter unit wherein air introduced into the first chamber through the first inlet is turned within the first chamber; and wherein each of the secondary cyclone vessel units comprises:
- a second air inlet, the second inlet inducing a cyclonic air flow;
- a second cyclone vessel body, wherein air introduced into the second cyclone vessel body through the second inlet is turned within the second cyclone vessel body; and
- a second outlet for discharging dust removed air.

7. A cyclone vessel dust collector as claimed in claim 6, further comprising a second chamber for receiving the second cyclone vessel bodies.

8. A cyclone vessel dust collector comprising:
a cyclone vessel main-body including a primary cyclone vessel unit for separating dusts from drawn-in air, the cyclone vessel main body having an outer circumference, the cyclone vessel main body having a first wall having a first radius such that the first wall surrounds the outer circumference of the primary cyclone vessel, the cyclone vessel main body further having a second wall having a second radius that is greater than the first radius such that the second wall surrounds the first wall and defines a chamber between the first wall and second wall wherein there are three or more secondary cyclone vessel units for separating dusts from the air passing through the primary cyclone vessel unit the secondary cyclone vessel units being arranged to surround at least a part of the primary cyclone vessel unit;
a dirt collection bin, operatively coupled to the cyclone vessel main body, receiving particles of dust separated in the cyclone vessel main-body, the dirt collection bin including a separation membrane, which reduces air rotation in the dirt collection bin; and
wherein the outer circumference of the dirt collection bin has a non-constant radius.

9. A cyclone vessel dust collector as claimed in claim 8, further comprising a cover mounted on the top of the cyclone vessel main-body.

10. A cyclone vessel dust collector as claimed in claim 9, wherein the cover comprises, a cover outlet and a cover chamber for accumulating the air discharged from the secondary cyclone vessel units.

11. A cyclone vessel dust collector as claimed in claim 8, wherein the first wall defines an outer wall of the first chamber, within which the air introduced into the primary cyclone vessel unit is turned, and the second wall defines an outer wall of the second chamber for receiving at least a part of the secondary cyclone vessel units.

12. A cyclone vessel dust collector as claimed in claim 8, wherein the dirt collection bin is partitioned into a first collection chamber and a second collection chamber.

13. A cyclone vessel dust collector as claimed in claim 12, wherein the first dust collection chamber is communicated with the first chamber to receive dusts separated in the primary cyclone vessel unit, and the second dust collection chamber receives dusts separated in the secondary cyclone vessel units.

14. A cyclone vessel dust collector as claimed in claim 13, wherein the second dust collection chamber is arranged to surround at least a part of the outer circumference of the first dust collection chamber.

15. A cyclone vessel dust collector as claimed in claim 8, wherein the outer circumference of the dirt collection bin comprises a third wall and a fourth wall having a radius larger than that of the third wall.

16. A cyclone vessel dust collector as claimed in claim 15, wherein the fourth wall includes a raised part which can be conveniently gripped by a user.

17. A cyclone vessel dust collector as claimed in claim 16, wherein a groove is formed on the top of the dirt collection bin and sized, shaped and arranged to receive a sealing member in the groove.

18. A cyclone vessel dust collector comprising:
a cyclone vessel main-body including a primary cyclone vessel unit separating dusts from dust-containing air, and three or more secondary cyclone vessel units separating dusts from the air passing through the primary cyclone vessel unit, the secondary cyclone vessel units being located within a chamber defined as a space between a first wall that has a first radius and which surrounds the primary cyclone vessel unit and, a second wall having a second radius larger than the first radius and surrounding the first wall, the secondary cyclone vessel units being circumferentially arranged to be placed around the primary cyclone vessel unit in order to surround at least a part of the primary cyclone vessel unit, wherein the cyclone vessel main-body has a non-uniform outer circumference; and
a dirt collection bin, collecting dusts or the like separated in the cyclone vessel main-body,
wherein the cyclone vessel main body has a first inlet, which decreases in cross-sectional area while being curved along an inner wall of the first cyclone vessel unit.

19. A cyclone vessel dust collector as claimed in claim 18, wherein first inlet has a cross-section that is a substantially rectangular shape with a domed top side.

20. A cyclone vessel dust collector as claimed in claim 18, further comprising a cover mounted on the top of the cyclone vessel main-body.

21. A vacuum cleaner comprising:
a vacuum cleaner body including a vacuum source;
a brush assembly communicated with the vacuum cleaner body and provided with a suction port for inhaling air; and
a cyclone vessel dust collector installed in the vacuum cleaner body to remove dusts or the like from the air inhaled through the brush assembly,
wherein the cyclone vessel dust collector comprises:
a cyclone vessel main-body including a primary cyclone vessel unit for separating dusts from dust containing air, the primary cyclone vessel having an outer circumference, the cyclone vessel main body having a first wall having a first radius such that the first wall surrounds the outer circumference of the primary cyclone vessel, the cyclone vessel main body further having a second wall having a second radius that is greater than the first radius such that the second wall surrounds the first wall and defines a chamber between the first wall and second wall wherein there are located three or more secondary cyclone vessel units for separating dusts from the air passing through the primary cyclone vessel unit, the secondary cyclone vessel units being arranged to surround at least a part of the primary cyclone vessel unit, wherein the cyclone vessel main-body has a non-uniform outer circumference; and a dirt collection bin for collecting dusts or the like separated in the cyclone vessel main-body.

22. A vacuum cleaner as claimed in claim 21, further comprising: a cover mounted on the top of the cyclone vessel main-body.

23. A vacuum cleaner as claimed in claim, wherein the cover comprises: a cover outlet and a cover chamber for collecting the air discharged from the secondary cyclone vessel units.

24. A vacuum cleaner as claimed in claim 22, wherein the outer circumference of the cyclone vessel main-body comprises: a first wall and a second wall having a radius larger than that of the first wall.

25. A vacuum cleaner as claimed in claim 24, wherein the first wall is inserted into the vacuum cleaner body, and the second wall projects outward of the vacuum cleaner body.

26. A vacuum cleaner as claimed in claim 25, wherein the cyclone vessel dust collector comprises: a first chamber and a second chamber for receiving the secondary cyclone vessels, and wherein the first wall defines at least a part of the outer circumference of the first chamber and the second wall defines at least a part of the outer circumference of the second chamber.

27. A vacuum cleaner as claimed in claim 25, wherein the radius from the center of the cyclone vessel main-body to the second wall is about a half of the width of the vacuum cleaner body.

28. A vacuum cleaner as claimed in claim 21, wherein the dirt collection bin comprises: a first dust collection chamber for receiving dusts or the like separated in the primary cyclone vessel unit and a second dust collection chamber for receiving dusts or the like separated in the secondary cyclone vessel units.

29. A vacuum cleaner as claimed in claim 28, wherein the second dust collection chamber surrounds at least a part of the first dust collection chamber.

30. A vacuum cleaner as claimed in claim 29, wherein the second dust collection chamber includes a circumferential part projecting so that a user can grip the dirt collection bin.

* * * * *